(12) United States Patent
Hsu et al.

(10) Patent No.: US 10,669,999 B1
(45) Date of Patent: Jun. 2, 2020

(54) ENERGY STORAGE AND TRANSMISSION SYSTEM

(71) Applicants: Fu-Tzu Hsu, Taipei (TW); Chieh-Sen Tu, New Taipei (TW)

(72) Inventors: Fu-Tzu Hsu, Taipei (TW); Chieh-Sen Tu, New Taipei (TW)

( * ) Notice: Subject to any disclaimer, the term of this patent is extended or adjusted under 35 U.S.C. 154(b) by 0 days.

(21) Appl. No.: 16/447,583

(22) Filed: Jun. 20, 2019

(51) Int. Cl.
| | |
|---|---|
| *F03G 3/08* | (2006.01) |
| *H02K 7/116* | (2006.01) |
| *F16H 39/16* | (2006.01) |
| *H02K 7/00* | (2006.01) |
| *H02K 11/33* | (2016.01) |
| *H02K 7/02* | (2006.01) |

(52) U.S. Cl.
CPC .............. *F03G 3/08* (2013.01); *F16H 39/16* (2013.01); *H02K 7/003* (2013.01); *H02K 7/025* (2013.01); *H02K 7/116* (2013.01); *H02K 11/33* (2016.01)

(58) Field of Classification Search
CPC .......... F03G 3/08; H02K 11/33; H02K 7/003; H02K 7/025; H02K 7/116; F16H 39/16
See application file for complete search history.

(56) References Cited

U.S. PATENT DOCUMENTS

| | | | | |
|---|---|---|---|---|
| 6,177,734 B1* | 1/2001 | Masberg | ............... | B60K 6/26 |
| | | | | 290/31 |
| 8,684,338 B2* | 4/2014 | Plahn | .................. | F02B 63/04 |
| | | | | 267/136 |
| 9,503,012 B1* | 11/2016 | Hsu | ..................... | H02P 27/06 |
| 2014/0117786 A1* | 5/2014 | Gosvener | ........... | H02K 33/16 |
| | | | | 310/23 |
| 2019/0089225 A1* | 3/2019 | Da Costa | ............ | F02B 63/041 |
| 2019/0280556 A1* | 9/2019 | Hsu | ..................... | F16F 15/30 |
| 2019/0326842 A1* | 10/2019 | Omekanda | ........ | F02N 11/0855 |

* cited by examiner

*Primary Examiner* — Viet P Nguyen
(74) *Attorney, Agent, or Firm* — Hamre, Schumann, Mueller & Larson, P.C.

(57) ABSTRACT

An energy storage and transmission system includes a flywheel energy storage device, a driver device and a transmission device. The flywheel energy storage device includes a flywheel, and a motor that is coupled to the flywheel. The driver device is electrically powered by a direct current (DC) power source, is coupled to the motor, and is for driving the motor and the flywheel. The transmission device includes a first crankshaft that is coupled to the motor and that is driven by the motor, a cylinder that is coupled to the first crankshaft, and a second crankshaft that is coupled to the cylinder.

12 Claims, 20 Drawing Sheets

ENERGY STORAGE AND TRANSMISSION SYSTEM

FIELD

The disclosure relates to energy storage and transmission, and more particularly to an energy storage and transmission system.

BACKGROUND

Referring to FIG. 1, a conventional energy storage system includes a flywheel energy storage device 91 and a driver device 92. The flywheel energy storage device 91 includes a flywheel 911, and a motor 912 that can also be used in reverse as a generator. Referring to FIGS. 1 and 2, the motor 912 includes a stator (not shown), a rotor (not shown) that is coupled to the flywheel 911, and three coils (R, S, T) that are wound around the stator.

As shown in FIG. 2, the coils (R, S, T) cooperatively form a star configuration 913 that has a central terminal (Np) and three end terminals (U, V, W), with each coil (R, S, T) coupled between a respective end terminal (U, V, W) and the central terminal (Np). Referring to FIGS. 1 and 3, the driver device 92 is electrically powered by a direct current (DC) power source 93, and is for driving the motor 912. As shown in FIG. 3, the driver device 92 includes three legs 921-923. Each leg 921-923 includes a first switch (U+, V+, W+) and a second switch (U−, V−, W−) which are coupled to each other, and a common node of which is coupled to a respective end terminal (U, V, W). The first switches (U+, V+, W+) are coupled to each other, and a common node thereof is used to be coupled to a positive terminal of the DC power source 93. The second switches (U−, V−, W−) are coupled to each other, and a common node thereof is used to be coupled to a negative terminal of the DC power source 93. Referring to FIGS. 1 to 3, each of the first and second switches (U+, V+, W+, U−, V−, W−) alternates between conduction and non-conduction in such a way that the coils (R, S, T) are repeatedly excited by a DC supply voltage (Vdc) which is supplied by the DC power source 93. As a consequence, the coils (R, S, T) cause the rotor to rotate (i.e., performing electrical to mechanical conversion), and the rotor causes the flywheel 911 to rotate and store mechanical energy. In case the driver device 92 is no longer coupled to the DC power source 93, the flywheel 911 causes the rotor to rotate and releases the energy stored therein, and the rotor causes the coils (R, S, T) to provide electrical energy (i.e., performing mechanical to electrical conversion).

Upon each of the first and second switches (U+, V+, W+, U−, V−, W−) becoming non-conducting, a counter electromotive force (CEMF) is developed across one of the coils (R, S, T) that is coupled to the switch (U+, V+, W+, U−, V−, W−). For example, when the first switch (U+) and the second switch (V−) both conduct, the DC supply voltage (Vdc) is applied across the coils (R, S) to excite the coils (R, S) as shown in FIG. 2, and the coils (R, S) store electrical energy. Upon the first switch (U+) and the second switch (V−) both becoming non-conducting, the CEMFs (e1, e2) are respectively developed across the coils (R, S) as shown in FIG. 4, and the coils (R, S) release the energy stored therein. The CEMFs (e1, e2) continue until the energy stored in the coils (R, S) is fully released. The respective CEMFs across the coils (R, S) directly impact the DC power source 93, resulting in variation of the DC supply voltage (Vdc). The energy released by the coils (R, S, T) is dissipated as heat by the motor 912 and the legs 921-923, resulting in energy loss and temperature increase of the motor 912 and the legs 921-923. In order to alleviate the aforesaid phenomena, a capacitor (Cd) is included in the conventional energy storage system and is coupled between the common node of the first switches (U+, V+, W+) and the common node of the second switches (U−, V−, W−) as shown in FIG. 3 for stabilizing the DC supply voltage (Vdc), and for storing the energy that is released by the coils (R, S, T) and that flows through respective parasitic diodes (D) of the first and second switches (U+, V+, W+, U−, V−, W−) to the capacitor (Cd). The energy stored in the capacitor (Cd) assists in electrically powering the legs 921-923. However, the capacitor (Cd) can only store a small portion of the energy released by the coils (R, S, T), and a remaining portion of the energy released by the coils (R, S, T) is still dissipated as heat by the motor 912 and the legs 921-923. Therefore, the conventional energy storage system has poor energy saving performance, and a cooling system is required to cool the motor 912 and the legs 921-923.

Moreover, an internal combustion engine uses fuel to cause reciprocal movement of a piston of a cylinder thereof.

SUMMARY

Therefore, an object of the disclosure is to provide an energy storage and transmission system that has good energy saving performance, and that can cause reciprocal movement of a piston of a cylinder thereof without using fuel.

According to the disclosure, the energy storage and transmission system includes a flywheel energy storage device, a driver device and a transmission device.

The flywheel energy storage device includes an electric machine. The electric machine includes a flywheel and a motor. The motor includes a stator, a rotor that is coupled to the flywheel, and a number (P) of coils that are wound around the stator, where P≥3. The coils cooperatively form a star configuration that has a central terminal and a number (P) of end terminals, with each of the coils coupled between a respective one of the end terminals of the star configuration and the central terminal of the star configuration.

The driver device is for driving the flywheel energy storage device, and includes a number (P) of legs, a number (P) of first diodes, a number (P) of second diodes, at least one first capacitor, a second capacitor and a third capacitor. Each of the legs includes a first switch and a second switch which are coupled to each other, and a common node of which is coupled to a respective one of the end terminals of the star configuration. The first switches of the legs are coupled to each other, and a common node thereof is used to be coupled to a positive terminal of a direct current (DC) power source. The second switches of the legs are coupled to each other, and a common node thereof is used to be coupled to a negative terminal of the DC power source. Each of the first diodes is coupled to the first switch of a respective one of the legs in parallel, with its anode coupled to the common node of the first and second switches of the respective one of the legs. Each of the second diodes is coupled to the second switch of a respective one of the legs in parallel, with its cathode coupled to the common node of the first and second switches of the respective one of the legs. Each of the at least one first capacitor is coupled between the common node of the first switches and the common node of the second switches. The second capacitor is coupled between the common node of the first switches and the central terminal of the star configuration. The third capacitor is coupled between the central terminal of the star configuration and the common node of the second switches.

The transmission device is driven by the flywheel energy storage device, and includes a cylinder, a first crankshaft and a second crankshaft. The cylinder includes a housing, a piston, a first connecting rod and a second connecting rod. The housing defines a first space, a second space, and a channel that is in spatial communication with the first and second spaces. The piston is disposed in the channel, and is capable of reciprocal movement in the channel. The first connecting rod is disposed in the first space and the channel, and has a first terminal that is pivotally coupled to the piston in the channel, and a second terminal that is disposed in the first space. The second connecting rod is disposed in the second space and the channel, and has a first terminal that is pivotally coupled to the piston in the channel, and a second terminal that is disposed in the second space. The first crankshaft includes a first shaft journal that is coupled to the rotor, and a first crank arm that extends radially from the first shaft journal, that is disposed in the first space, and that is pivotally coupled to the second terminal of the first connecting rod. The second crankshaft includes a second shaft journal, and a second crank arm that extends radially from the second shaft journal, that is disposed in the second space, and that is pivotally coupled to the second terminal of the second connecting rod.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
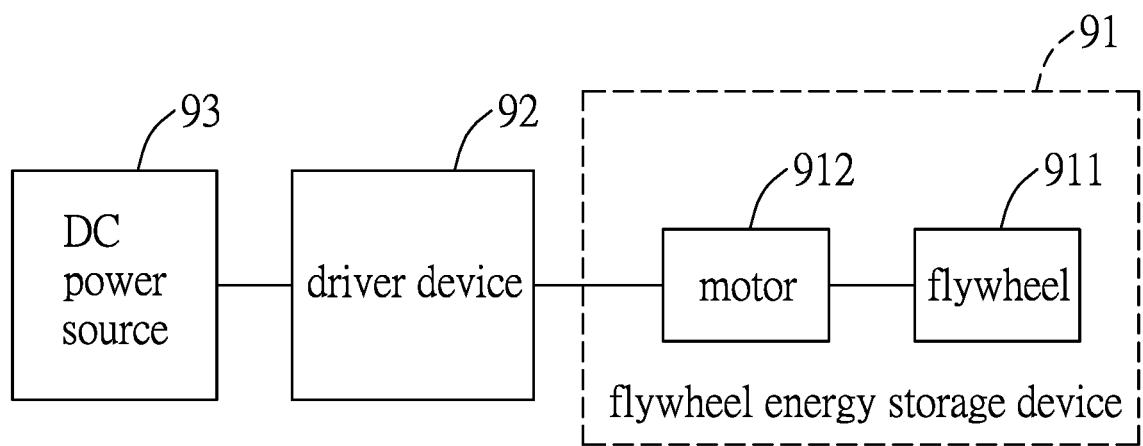
FIG. 1 is a block diagram illustrating a conventional energy storage system.
Figure 2:
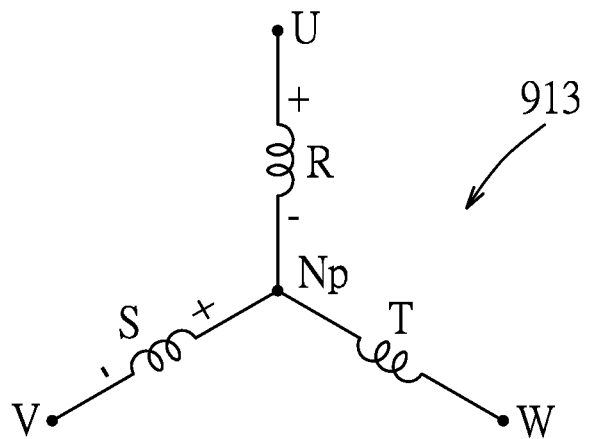
FIG. 2 is a circuit diagram illustrating coils of a motor of the conventional energy storage system.
Figure 3:
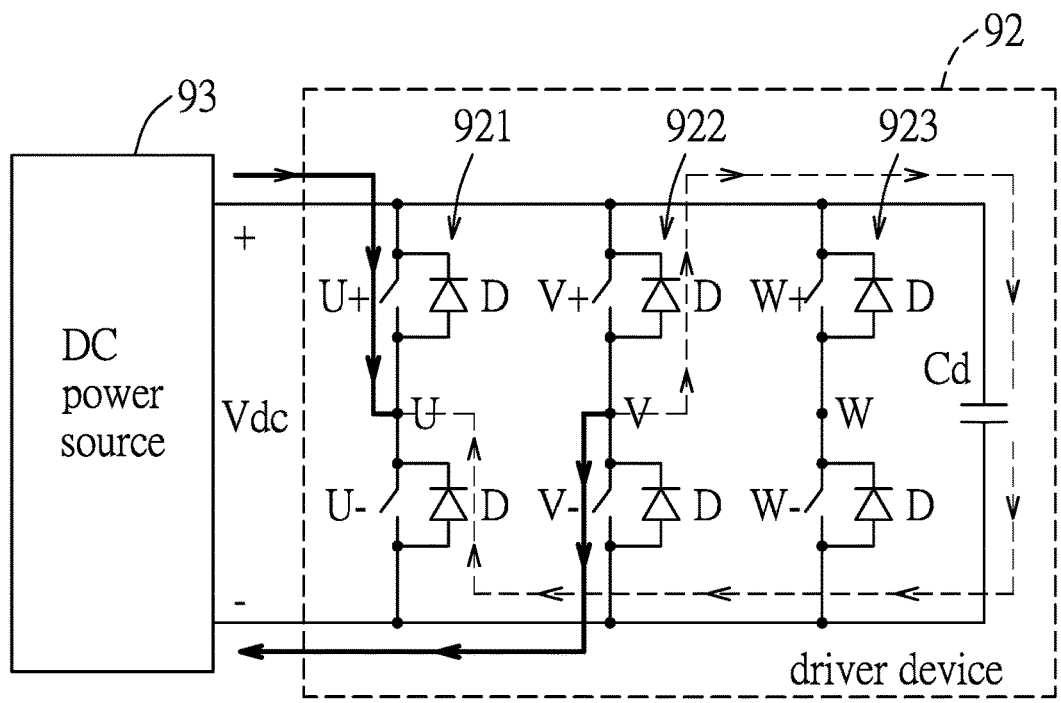
FIG. 3 is a circuit block diagram illustrating a driver device of the conventional energy storage system.
Figure 4:
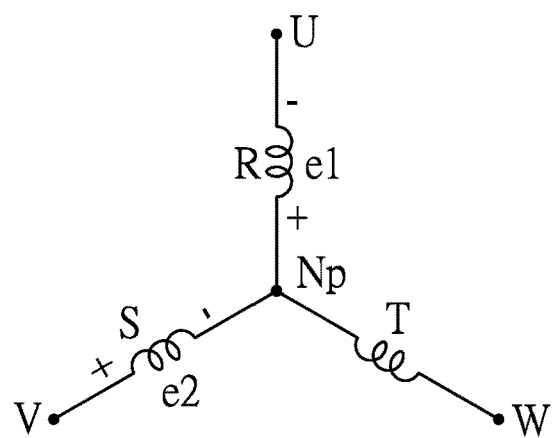
FIG. 4 is a circuit diagram illustrating a scenario where electromotive forces are respectively developed across two of the coils of the conventional energy storage system.

Before the disclosure is described in greater detail, it should be noted that where considered appropriate, reference numerals or terminal portions of reference numerals have been repeated among the figures to indicate corresponding or analogous elements, which may optionally have similar characteristics.

Moreover, it should be noted that throughout the disclosure, "damping" should be interpreted as "oscillating", and a swing of the oscillation may be increasing, constant or decreasing.

Figure 5:
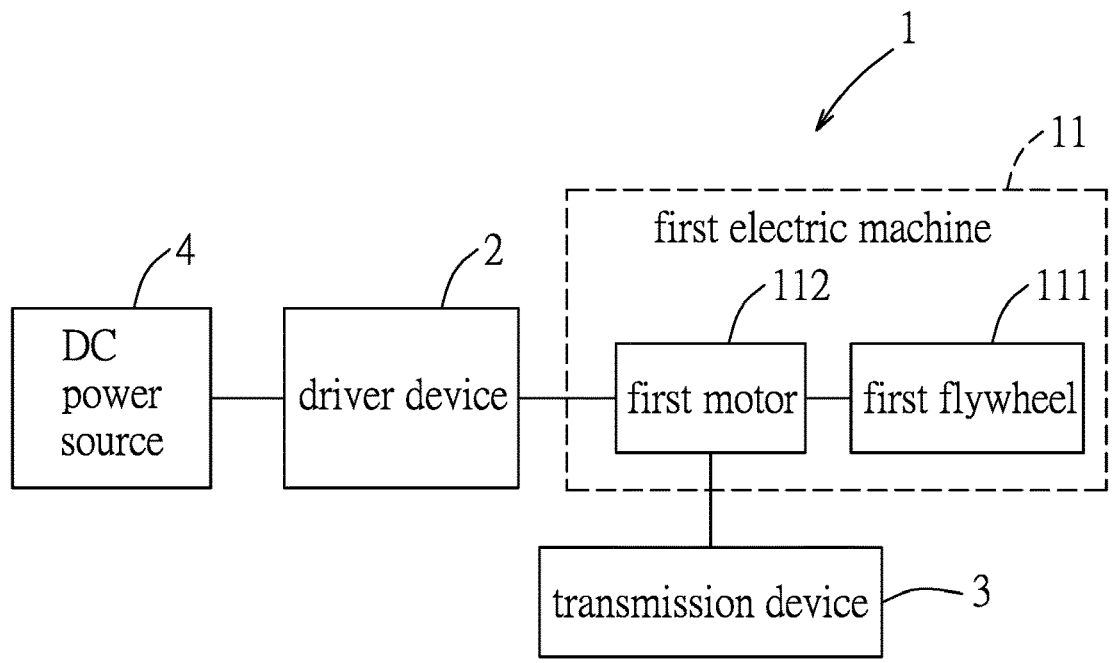
FIG. 5 is a block diagram illustrating a first embodiment of an energy storage and transmission system according to the disclosure.

Referring to FIG. 5, a first embodiment of an energy storage and transmission system according to the disclosure includes a flywheel energy storage device 1, a driver device 2 and a transmission device 3.

Referring to FIGS. 5 to 8, the flywheel energy storage device 1 includes a first electric machine 11. The first electric machine 11 includes a first flywheel 111 and a first motor 112. The first motor 112 includes a first stator 1121, a first rotor 1122 that is coupled to the first flywheel 111, and a number (P) (P≥3, e.g., three in this embodiment) of first coils (R, S, T) that are wound around the first stator 1121. In this embodiment, the first stator 1121 surrounds the first rotor 1122, but the disclosure is not limited thereto. The first coils (R, S, T) cooperatively form a first star configuration 15 that has a central terminal (Np) and a number (P) (three in this embodiment) of end terminals (U, V, W), with each first coil (R, S, T) coupled between a respective end terminal (U, V, W) and the central terminal (Np).

Figure 9:
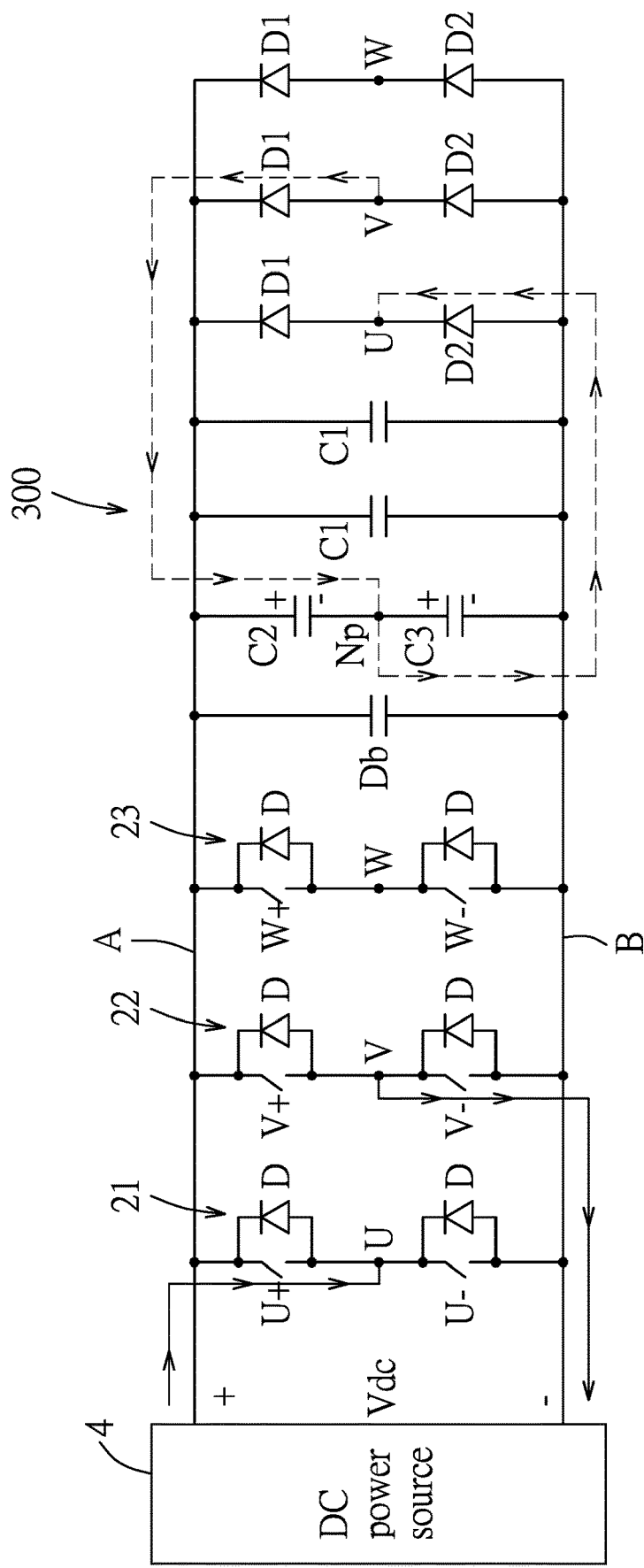
FIG. 9 is a circuit block diagram illustrating a driver device of the first embodiment.

Referring to FIGS. 5 and 9, the driver device 2 is electrically powered by a direct current (DC) power source 4, and is for driving the flywheel energy storage device 1. The driver device 2 includes a number (P) (three in this embodiment) of legs 21-23, a number (P) (three in this embodiment) of first diodes (D1), a number (P) (three in this embodiment) of second diodes (D2), at least one (e.g., two in this embodiment) first capacitor (C1), a second capacitor (C2), a third capacitor (C3) and a rechargeable battery (Db). Each leg 21-23 includes a first switch (U+, V+, W+) and a second switch (U−, V−, W−) which are coupled to each other, and a common node of which is coupled to a respective end terminal (U, V, W). The first switches (U+, V+, W+) are coupled to each other, and a common node (A) thereof is used to be coupled to a positive terminal of the DC power source 4. The second switches (U−, V−, W−) are coupled to each other, and a common node (B) thereof is used to be coupled to a negative terminal of the DC power source 4. Each first diode (D1) is coupled to the first switch (U+, V+, W+) of a respective leg 21-23 in parallel, with its anode coupled to the common node of the first and second switches (U+, V+, W+, U−, V−, W−) of the respective leg 21-23. Each second diode (D2) is coupled to the second switch (U−, V−, W−) of a respective leg 21-23 in parallel, with its cathode coupled to the common node of the first and second switches (U+, V+, W+, U−, V−, W−) of the respective leg 21-23. Each first capacitor (C1) is coupled between the common nodes (A, B). The second capacitor (C2) is coupled between the common node (A) and the central terminal (Np). The third capacitor (C3) is coupled between the central terminal (Np) and the common node (B). The rechargeable battery (Db) is coupled between the common nodes (A, B).

In this embodiment, the second and third capacitors (C2, C3) have the same capacitance. In addition, each first capacitor (C1) is a polarized capacitor, with its positive terminal coupled to the common node (A) and its negative terminal coupled to the common node (B); each of the second and third capacitors (C2, C3) is a non-polarized capacitor; and the first to third capacitors (C1-C3) cooperatively constitute a damping capacitor unit capable of storing a large amount of electrical energy. Characteristics and functions of the damping capacitor unit are disclosed in Taiwanese Patent No. M477033, and details thereof are omitted herein for the sake of brevity. Moreover, the rechargeable battery (Db) is one (e.g., a capacitor battery, an acid/alkaline hybrid resonance battery or the like) with damping function.

Referring to FIGS. 6 to 9, the first and second switches (U+, V+, W+, U−, V−, W−) alternate between conduction and non-conduction in such a way that the first coils (R, S, T) are repeatedly excited by a DC supply voltage (Vdc) which is supplied by the DC power source 4. As a consequence, the first coils (R, S, T) cause the first rotor 1122 to rotate (i.e., performing electrical to mechanical conversion), and the first rotor 1122 causes the flywheel 111 to rotate and store mechanical energy.

Figure 8:
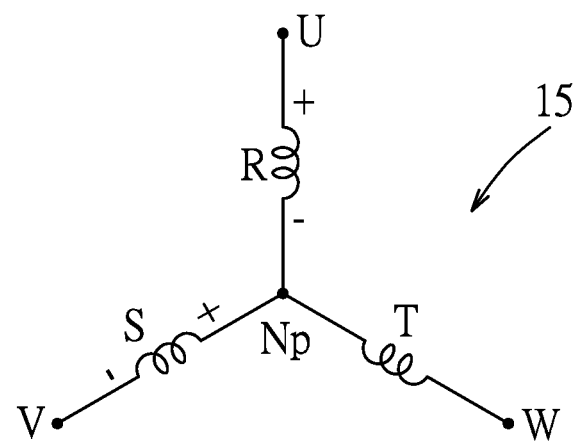
FIG. 8 is a circuit diagram illustrating first coils of the first motor of the first embodiment.
Figure 10:
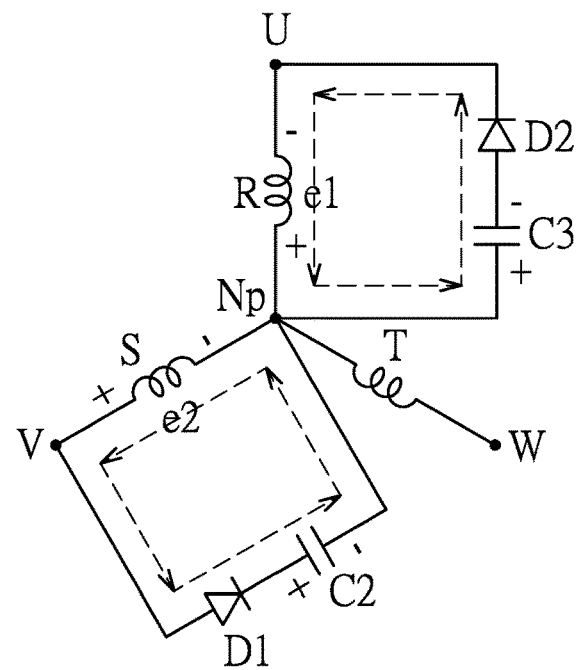
FIG. 10 a circuit diagram illustrating a scenario where electromotive forces are respectively developed across two of the first coils of the first embodiment.

Referring to FIGS. 8 to 10, upon each of the first and second switches (U+, V+, W+, U−, V−, W−) becoming non-conducting, a counter electromotive force (CEMF) is developed across one of the coils (R, S, T) that is coupled to the switch (U+, V+, W+, U−, V−, W−). For example, when the first switch (U+) and the second switch (V−) both conduct, the DC supply voltage (Vdc) is applied across the coils (R, S) to excite the coils (R, S) as shown in FIG. 8, and the coils (R, S) store electrical energy. Upon the first switch (U+) and the second switch (V−) both becoming non-conducting, the CEMFs (e1, e2) are respectively developed across the coils (R, S) as shown in FIG. 10, the coil (R) releases the energy stored therein to the third capacitor (C3) through the second diode (D2) that is coupled to the second switch (U−) in parallel instead of through a parasitic diode (D) of the second switch (U−), and the coil (S) releases the energy stored therein to the second capacitor (C2) through the first diode (D1) that is coupled to the first switch (V+) in parallel instead of through a parasitic diode (D) of the first switch (V+). Each CEMF (e1, e2) continues to exist until the energy stored in the respective coil (R, S) is fully released.

The first capacitors (C1) can stabilize the DC supply voltage (Vdc), so the DC supply voltage (Vdc) varies within a predetermined voltage range, and malfunction of the flywheel energy storage device 1 (see FIG. 5) can be prevented. In addition, the second and third capacitors (C2, C3) can perform pulsating DC to DC conversion on the respective CEMFs across the coils (R, S, T), resulting in damping effect, so most of the energy stored in the coils (R, S, T) can be transferred to the first to third capacitors (C1-C3) and the rechargeable battery (Db), instead of being dissipated as heat by the first motor 112 (see FIG. 5) and the legs 21-23. The energy stored in the first to third capacitors (C1-C3) and the rechargeable battery (Db) assists in electrically powering the legs 21-23. Therefore, the energy storage and transmission system of this embodiment has good energy saving performance, and does not require a cooling system to cool the first motor 112 (see FIG. 5) and the legs 21-23.

Figure 11:
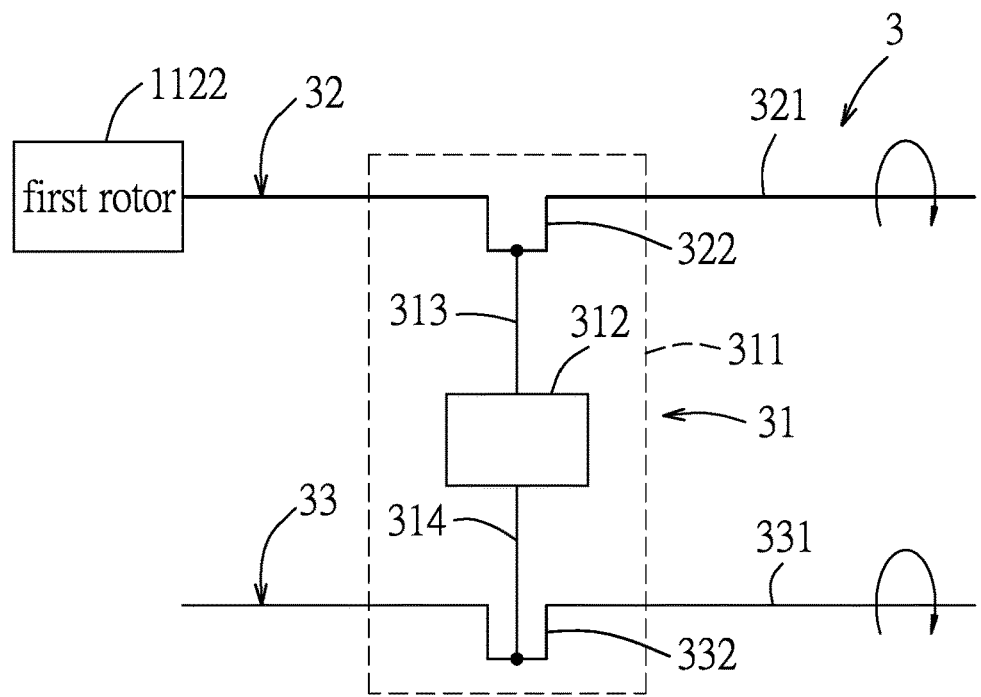
FIG. 11 a schematic block diagram illustrating a transmission device of the first embodiment.
Figure 13:
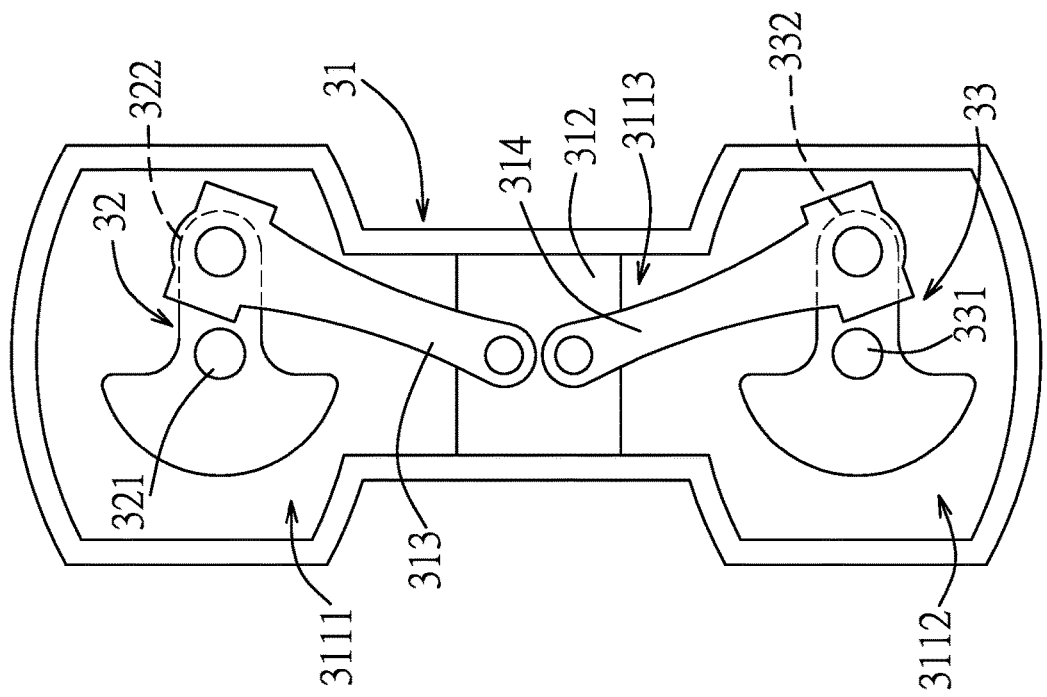
FIGS. 12 to 15 are structural diagrams illustrating operation of the transmission device of the first embodiment.
Figure 12:
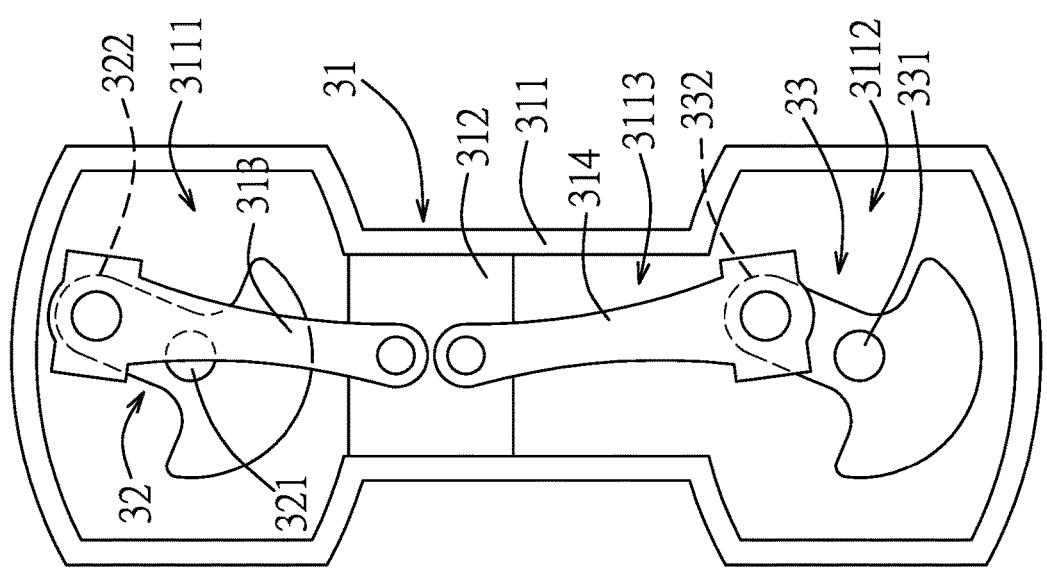
Figure 15:
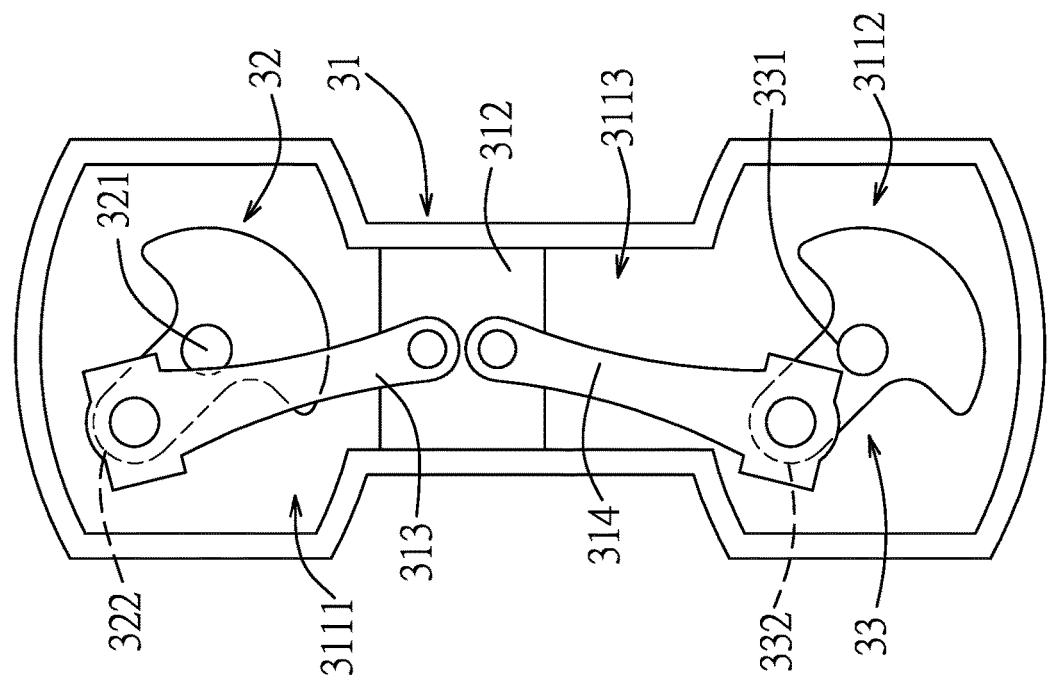
Figure 14:
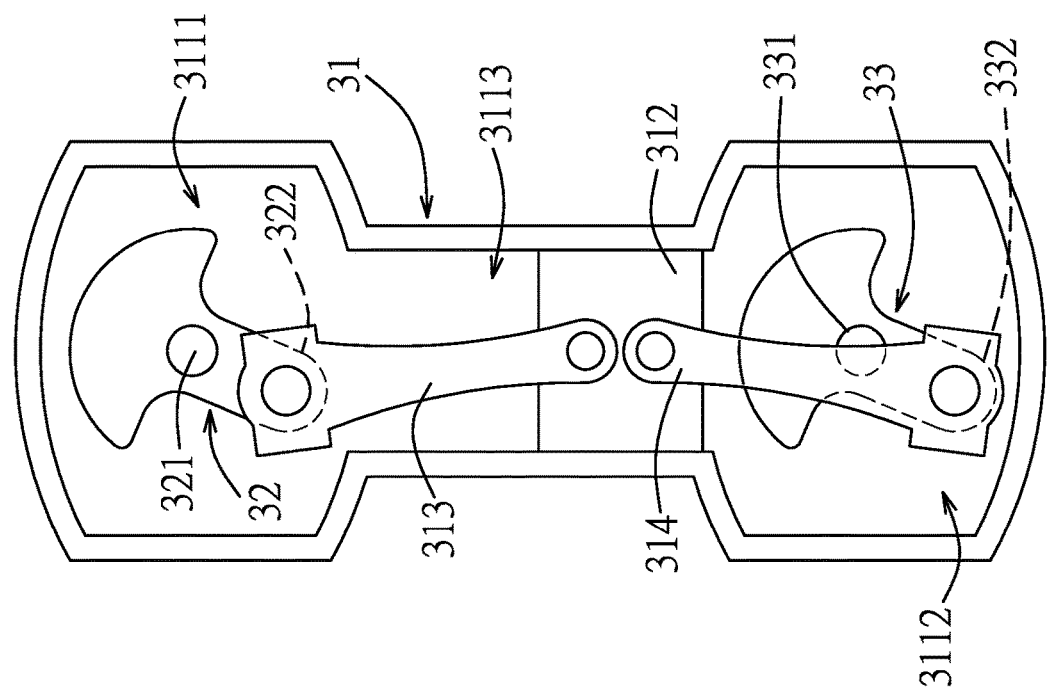

Referring to FIGS. 11 and 12, the transmission device 3 includes a cylinder 31, a first crankshaft 32 and a second crankshaft 33. The cylinder 31 includes a housing 311, a piston 312, a first connecting rod 313 and a second connecting rod 314. The housing 311 defines a first space 3111, a second space 3112, and a channel 3113 that is in spatial communication with the first and second spaces 3111, 3112. The piston 312 is disposed in the channel 3113, and is capable of reciprocal movement in the channel 3113. The first connecting rod 313 is disposed in the first space 3111 and the channel 3113, and has a first terminal that is pivotally coupled to the piston 312 in the channel 3113, and a second terminal that is disposed in the first space 3111. The second connecting rod 314 is disposed in the second space 3112 and the channel 3113, and has a first terminal that is pivotally coupled to the piston 312 in the channel 3113, and a second terminal that is disposed in the second space 3112. The first crankshaft 32 includes a first shaft journal 321 that is coupled to the first rotor 1122, and a first crank arm 322 that extends radially from the first shaft journal 321, that is disposed in the first space 3111, and that is pivotally coupled to the second terminal of the first connecting rod 313. The second crankshaft 33 includes a second shaft journal 331, and a second crank arm 332 that extends radially from the second shaft journal 331, that is disposed in the second space 3112, and that is pivotally coupled to the second terminal of the second connecting rod 314. As shown in FIGS. 12 to 15, in operation, the first rotor 1122 causes the first crankshaft 32 to rotate, the first crankshaft 32 causes the piston 312 to move reciprocally, and the piston 312 causes the second crankshaft 33 to rotate, resulting in damping effect, so most of the energy outputted by the first rotor 1122 can be transferred to the second crankshaft 33.

It should be noted that the energy storage and transmission system of this embodiment can be used in a vehicle (e.g., a car, a scooter or the like) to replace an internal combustion engine of the vehicle.

Figure 6:
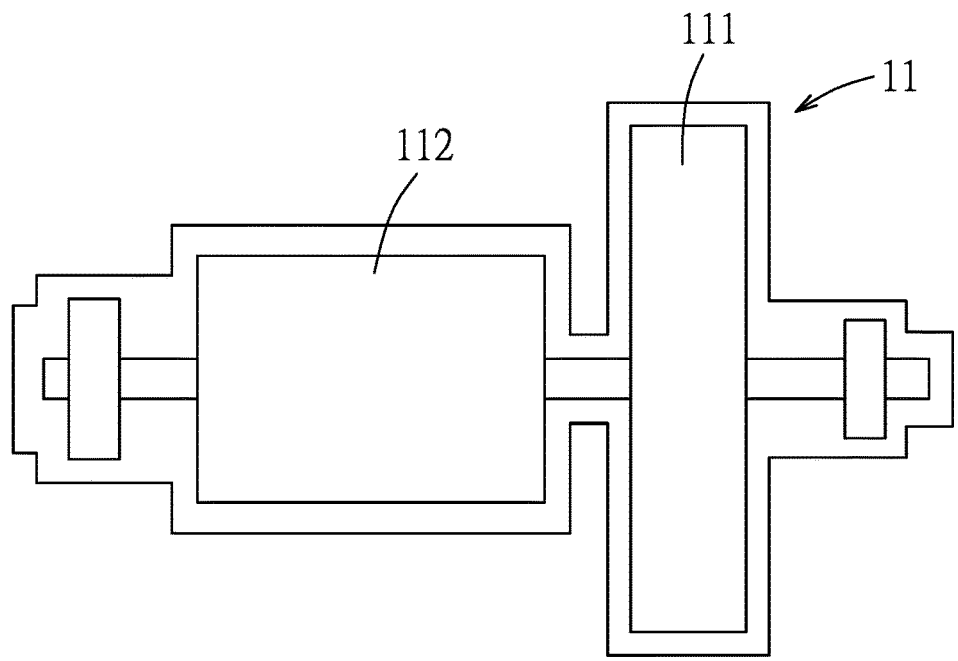
FIG. 6 is a structural diagram illustrating a flywheel energy storage device of the first embodiment.
Figure 7:
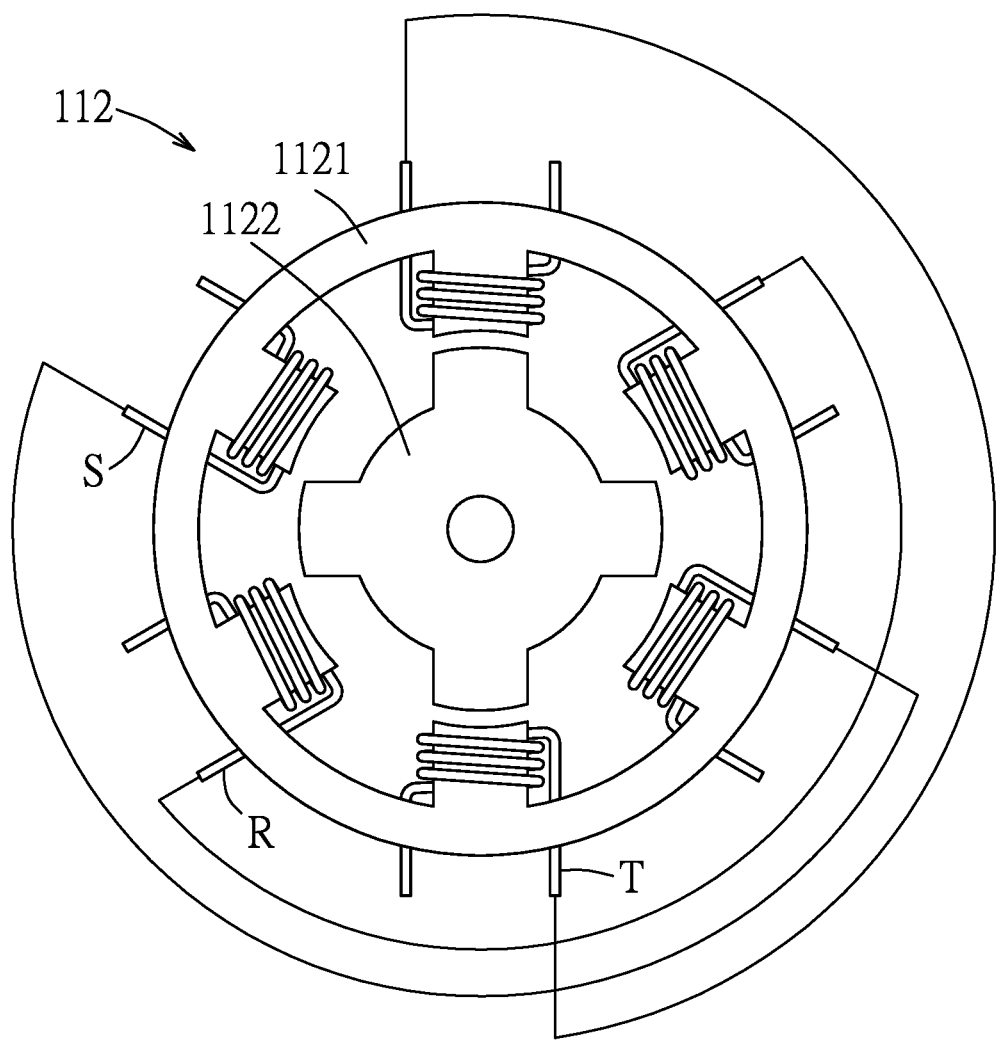
FIG. 7 is a structural diagram illustrating a first motor of the flywheel energy storage device of the first embodiment.

Referring to FIGS. 5 to 7, it should also be noted that, in a modification of the first embodiment, the first motor 112 is one that can be used in reverse as a generator. In this case, when the driver device 2 is no longer coupled to the DC power source 4, the flywheel 111 causes the first rotor 1122 to rotate and releases the energy stored therein, and the first rotor 1122 causes the first coils (R, S, T) to provide electrical energy (i.e., performing mechanical to electrical conversion).

Figure 16:
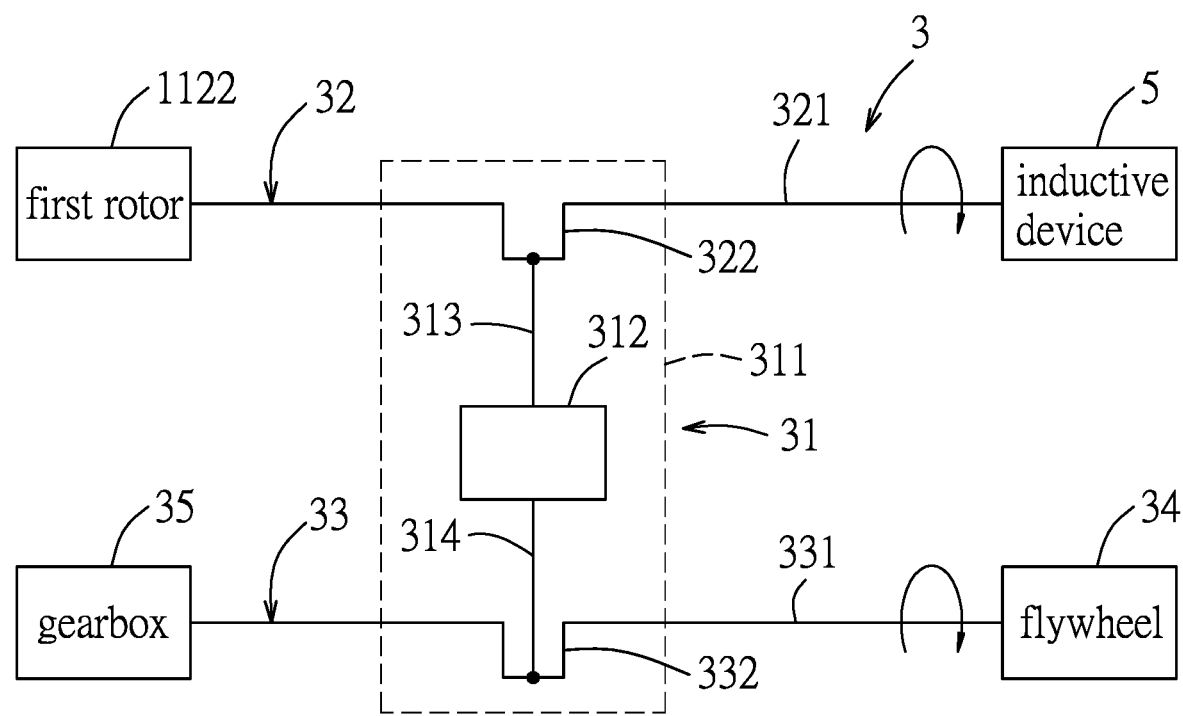
FIG. 16 a schematic block diagram illustrating the transmission device and an inductive device of a second embodiment of the energy storage and transmission system according to the disclosure.
Figure 17:
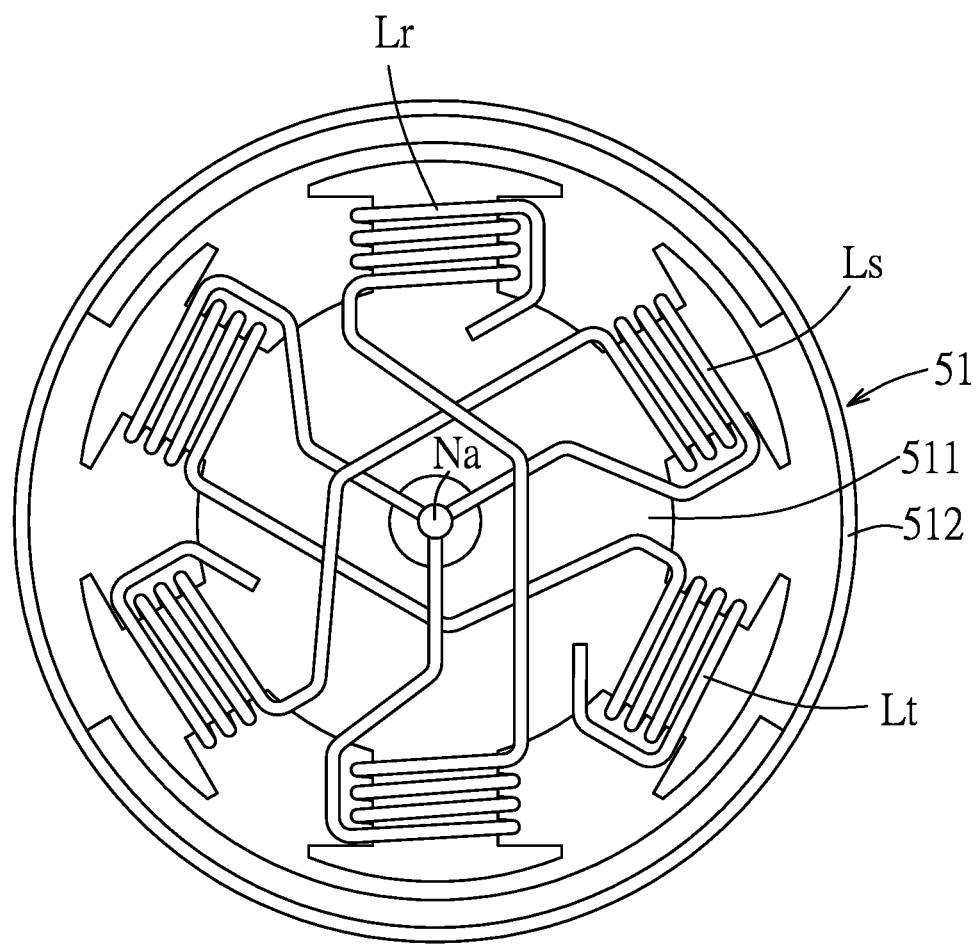
FIG. 17 is a structural diagram illustrating a generator of the inductive device of the second embodiment.
Figure 18:
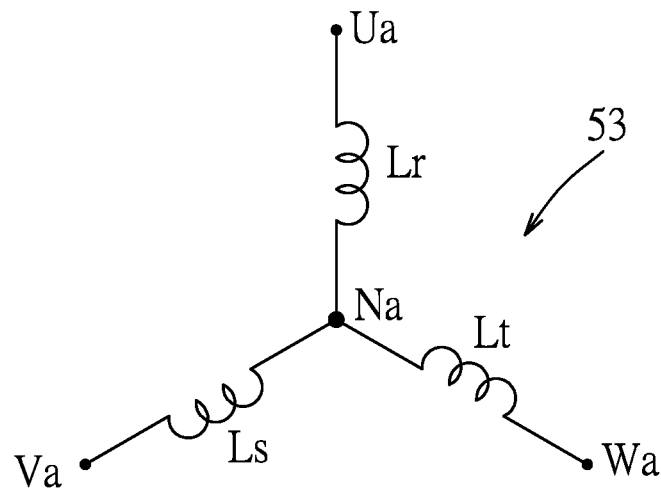
FIG. 18 is a circuit diagram illustrating coils of the generator of the second embodiment.
Figure 19:
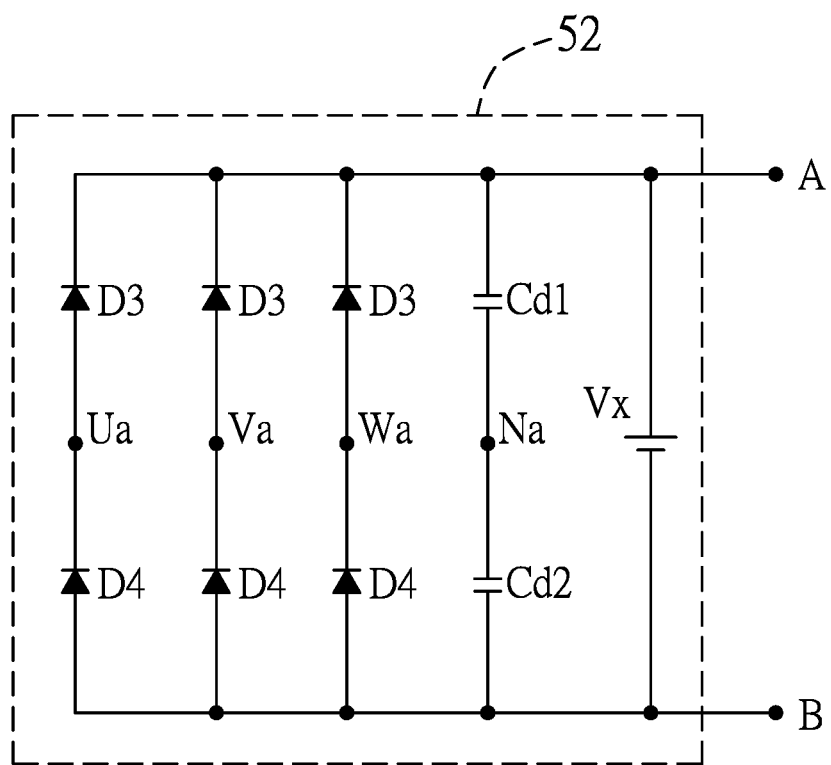
FIG. 19 is a circuit diagram illustrating a damping circuit of the inductive device of the second embodiment.

Referring to FIG. 16, a second embodiment of the energy storage and transmission system according the disclosure is a modification of the first embodiment, and differs from the first embodiment in that the transmission device 3 further includes a flywheel 34 and a gearbox 35, and that the energy storage and transmission system further includes an inductive device 5. Moreover, in the second embodiment, the DC power source 4 is a rechargeable battery.

The flywheel 34 is coupled to the second shaft journal 331, and rotates with the second shaft journal 331. The flywheel 34 can diminish fluctuations of a rotary speed of the second crankshaft 33, and can help provide energy when short time overloading occurs on the storage and transmission system of the second embodiment. The gearbox 35 is coupled to the second shaft journal 331, and has a variable gear ratio. The gear ratio can be set such that the flywheel energy storage device 1 (see FIG. 5) operates with lowest power consumption.

Referring to FIGS. 16 to 19, the inductive device 5 includes a generator 51 and a damping circuit 52. The generator 51 includes a stator 511, a rotor 512 and a number (Q) (Q≥3, e.g., three in this embodiment) of coils (Lr, Ls, Lt). The rotor 512 is coupled to the first shaft journal 321. The coils (Lr, Ls, Lt) are wound around one of the stator 511 and the rotor 512. In this embodiment, the rotor 512 surrounds the stator 511, and the coils (Lr, Ls, Lt) are wound around the stator 511. The coils (Lr, Ls, Lt) cooperatively form a second star configuration 53 that has a central terminal (Na) and a number (Q) (three in this embodiment) of end terminals (Ua, Va, Wa), with each coil (Lr, Ls, Lt) coupled between a respective end terminal (Ua, Va, Wa) and the central terminal (Na). The damping circuit 343 includes a number (Q) (three in this embodiment) of third diodes (D3), a number (Q) (three in this embodiment) of fourth diodes (D4), a first capacitor unit (Cd1), a second capacitor unit (Cd2) and an electrolytic battery (Vx). Each third diode (D3) has an anode that is coupled to a respective end terminal (Ua, Va, Wa), and a cathode that is coupled to the common node (A). Each fourth diode (D4) has an anode that is coupled to the common node (B), and a cathode that is coupled to a respective end terminal (Ua, Va, Wa). The first capacitor unit (Cd1) (e.g., a damping capacitor unit) is coupled between the common node (A) and the central terminal (Na). The second capacitor unit (Cd2) (e.g., a damping capacitor unit) is coupled between the central terminal (Na) and the common node (B). The electrolytic battery (Vx) is coupled between the common nodes (A, B). In operation, the first shaft journal 321 causes the rotor 512 to rotate, and the rotor 512 causes the coils (Lr, Ls, Lt) to provide electrical energy through the third and fourth diodes (D3, D4) to the first and second capacitor units (Cd1, Cd2), the electrolytic battery (Vx) and the DC power source 4 (i.e., performing mechanical to electrical conversion). Characteristics and functions of the inductive device 5 are disclosed in Taiwanese Patent Application No. 104122364, and details thereof are omitted herein for the sake of brevity.

Figure 20:
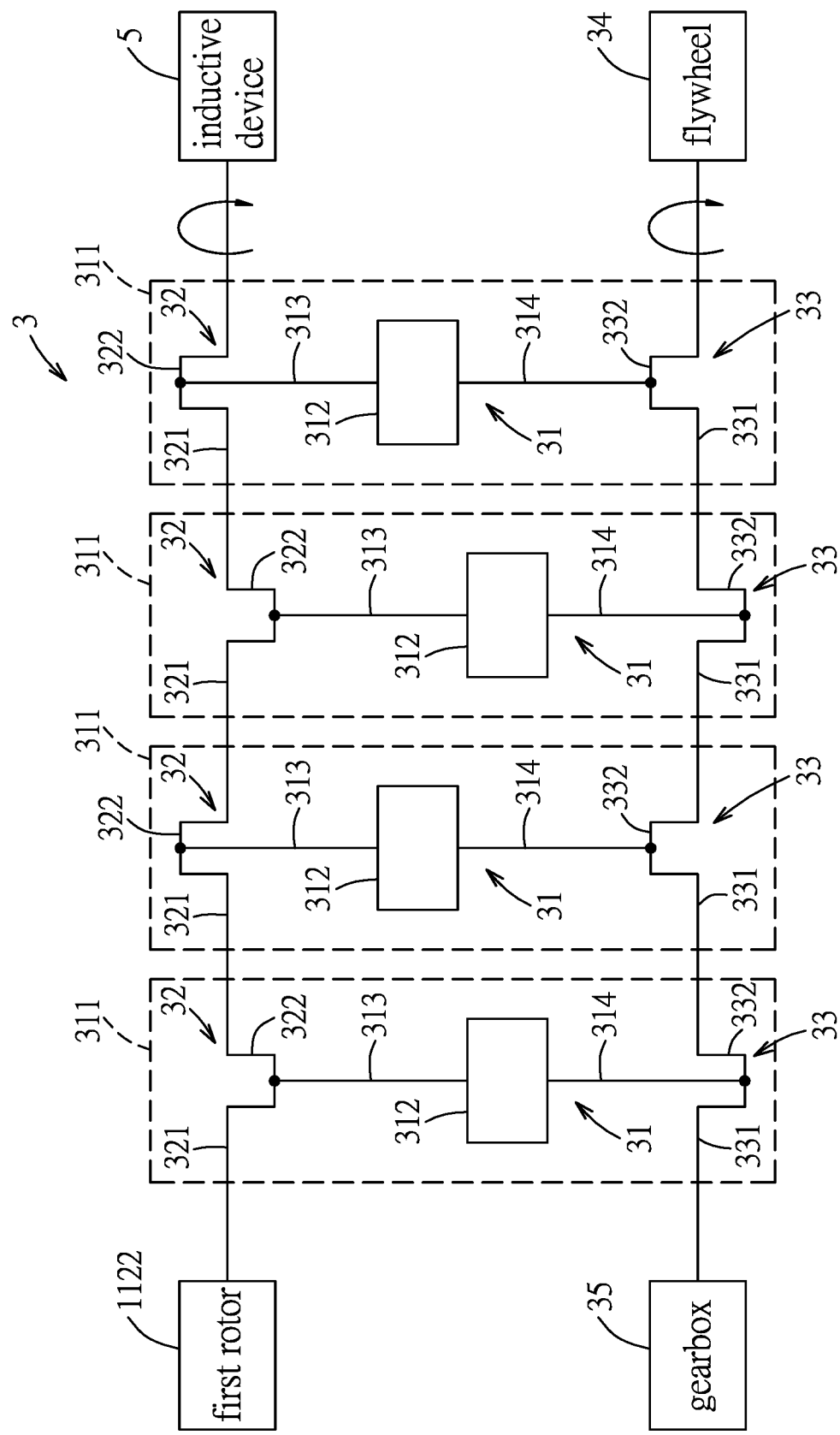
FIG. 20 is a schematic block diagram illustrating the transmission device of a third embodiment of the energy storage and transmission system according to the disclosure.

Referring to FIG. 20, a third embodiment of the energy storage and transmission system according the disclosure is a modification of the second embodiment, and differs from the second embodiment in that the transmission device 3 includes a number (H) (H≥2, e.g., four in this embodiment) of combinations of the cylinder 31 and the first and second crankshafts 32, 33.

In the third embodiment, the first shaft journal 321 of a first one of the combinations (hereinafter referred to as the first combination) is coupled to the first rotor 1122, the first shaft journal 321 of an $h^{th}$ one of the combinations (hereinafter referred to as the $h^{th}$ combination) is coupled to the first shaft journal 321 of an $(h-1)^{th}$ one of the combinations (hereinafter referred to as the $(h-1)^{th}$ combination), and the first shaft journal 321 of an $H^{th}$ (i.e., fourth in this embodiment) one of the combinations (hereinafter referred to as the $H^{th}$ combination) is coupled further to the inductive device 5, where 2≤h≤H (2≤h≤4 in this embodiment). In addition, the second shaft journal 331 of the first combination is coupled to the gearbox 35, the second shaft journal 331 of the $h^{th}$ combination is coupled to the second shaft journal 331 of the $(h-1)^{th}$ combination, and the second shaft journal 331 of the $H^{th}$ combination is coupled further to the flywheel 34. Moreover, the first crank arm 322 of the $h^{th}$ combination is offset from the first crank arm 322 of the $(h-1)^{th}$ combination by 180 degrees in orientation, and the second crank arm 332 of the $h^{th}$ combination is offset from the second crank arm 332 of the $(h-1)^{th}$ combination by 180 degrees in orientation. Therefore, the transmission device 5 of the third embodiment can provide relatively high power as compared to that of the second embodiment.

It should be noted that, in a modification of the third embodiment, the first crank arm 322 of the $h^{th}$ combination may be offset from the first crank arm 322 of the $(h-1)^{th}$ combination by (360/H) degrees (90 degrees in this modification) in orientation, and the second crank arm 332 of the $h^{th}$ combination may be offset from the second crank arm 332 of the $(h-1)^{th}$ combination by (360/H) degrees (90 degrees in this modification) in orientation.

Figure 21:
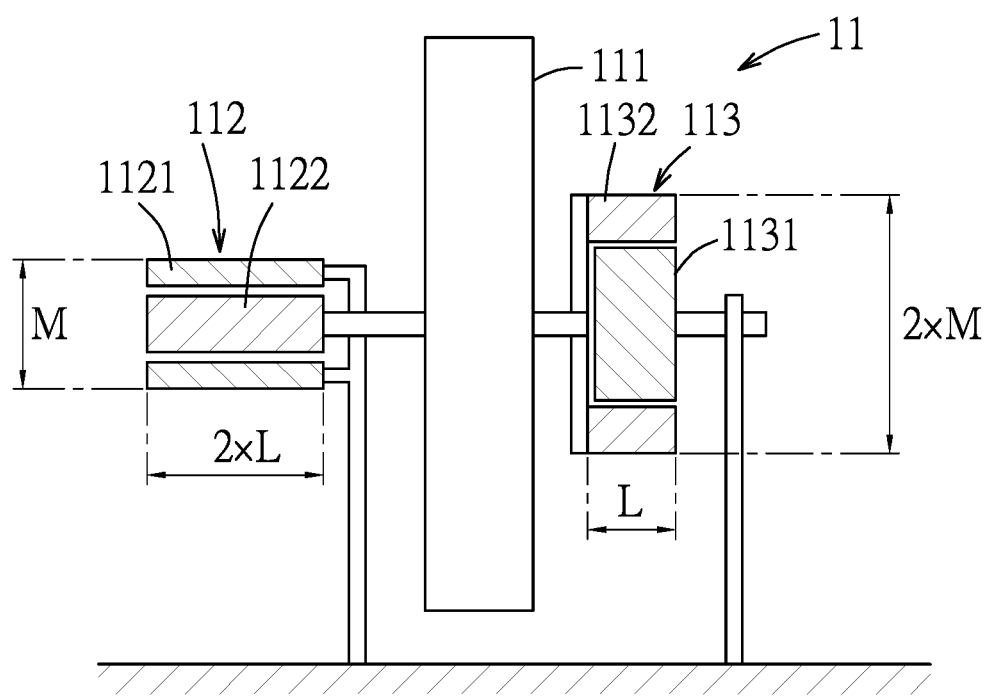
FIG. 21 is a structural diagram illustrating the flywheel energy storage device of a fourth embodiment of the energy storage and transmission system according to the disclosure.
Figure 22:
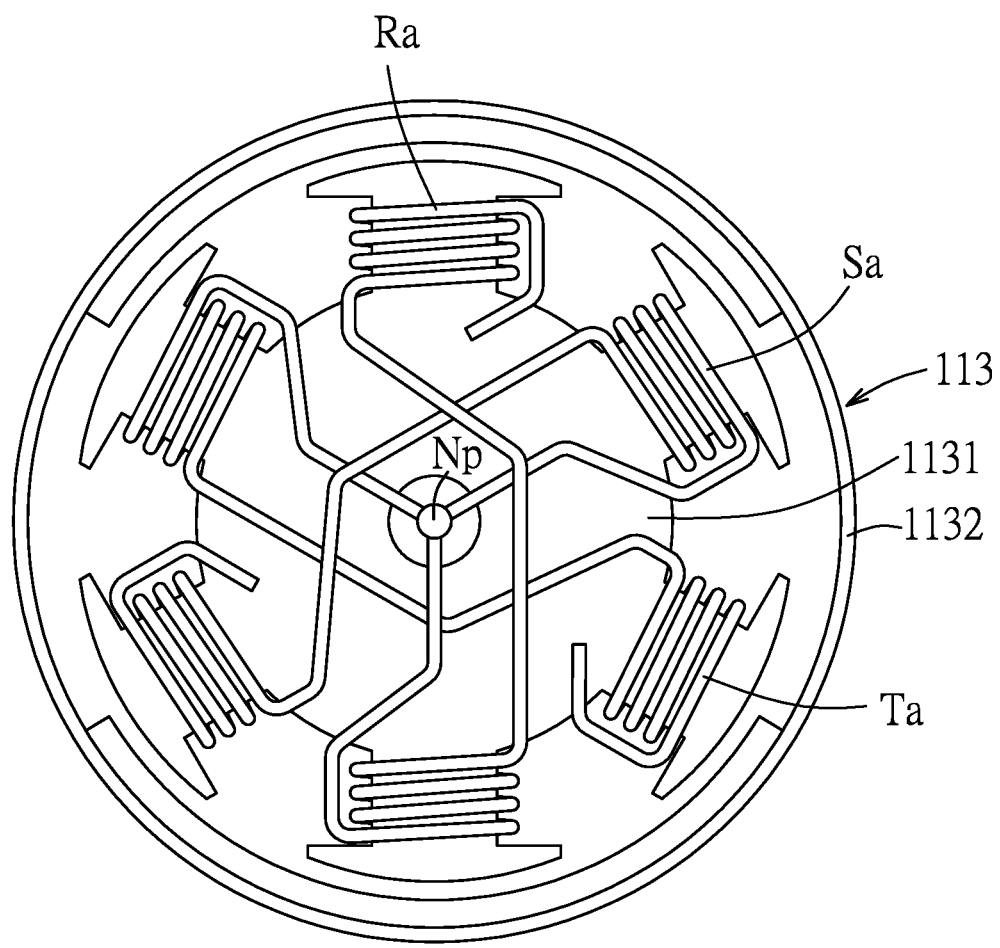
FIG. 22 is a structural diagram illustrating a second motor of the flywheel energy storage device of the fourth embodiment.
Figure 23:
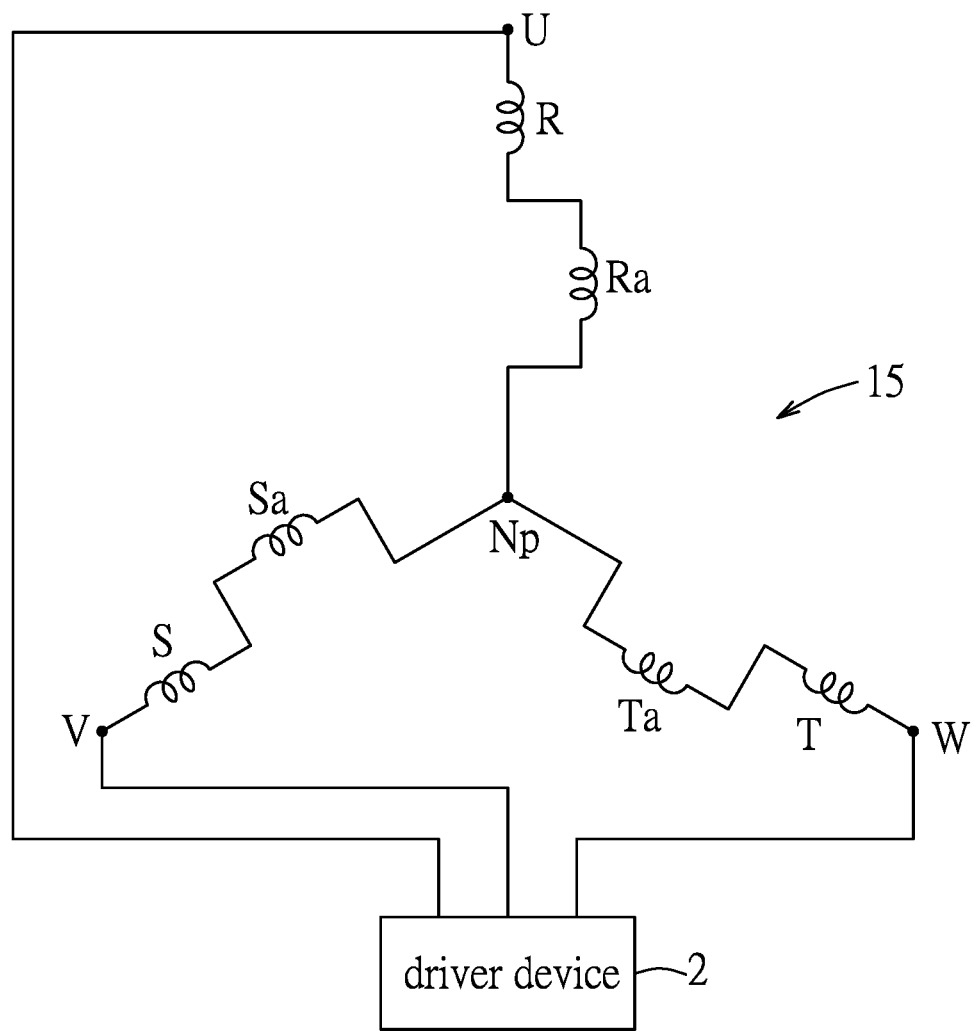
FIG. 23 is a circuit block diagram illustrating the first coils of the first motor and second coils of the second motor of the fourth embodiment.

Referring to FIGS. 21-23, a fourth embodiment of the energy storage and transmission system according the disclosure is a modification of the first embodiment, and differs from the first embodiment in that the first electric machine 11 further includes a second motor 113.

In the fourth embodiment, the second motor 113 includes a second stator 1131, a second rotor 1132 that is coupled to the first rotor 1122 and that surrounds the second stator 1131, and a number (P) (three in this embodiment) of second coils (Ra, Sa, Ta) that are wound around the second stator 1131. The second coils (Ra, Sa, Ta) cooperate with the first coils (R, S, T) to form the first star configuration 15, with each second coil (Ra, Sa, Ta) coupled in series with a respective first coil (R, S, T) between a respective end terminal (U, V, W) and the central terminal (Np). In operation, the driver device 2 causes the first and second rotors 1122, 1132 to rotate, and the first and second rotors 1122, 1132 cooperatively cause the first flywheel 111 and the first shaft journal 321 (see FIG. 11) to rotate (i.e., performing mechanical to electrical conversion).

In addition, the first motor 112 has an outer diameter of M and a length of 2×L, and the second motor 113 has an outer diameter of 2×M and a length of L. In other words, a ratio of the outer diameter of the first motor 112 to the outer diameter of the second motor 113 is 1:2, and a ratio of the length of the first motor 112 to the length of the second motor 113 is 2:1. Therefore, the first and second motors 112, 113 can provide the same output power.

Moreover, the first motor 112 is a high-speed low-torque motor, and the second motor 113 is a high-torque low-speed motor, so the flywheel energy storage device 1 (see FIG. 5) of the fourth embodiment can provide high speed and high torque simultaneously, and can provide relatively high power as compared to that of the first embodiment.

It should be noted that the first flywheel 111 may be disposed between the first and second motors 112, 113 as shown in FIG. 21, or may be disposed at a side of one of the first and second motors 112, 113 opposite to the other one of the first and second motors 112, 113.

It should also be noted that, in a modification of the fourth embodiment, each of the first and second motors 112, 113 is one that can be used in reverse as a generator.

Figure 24:
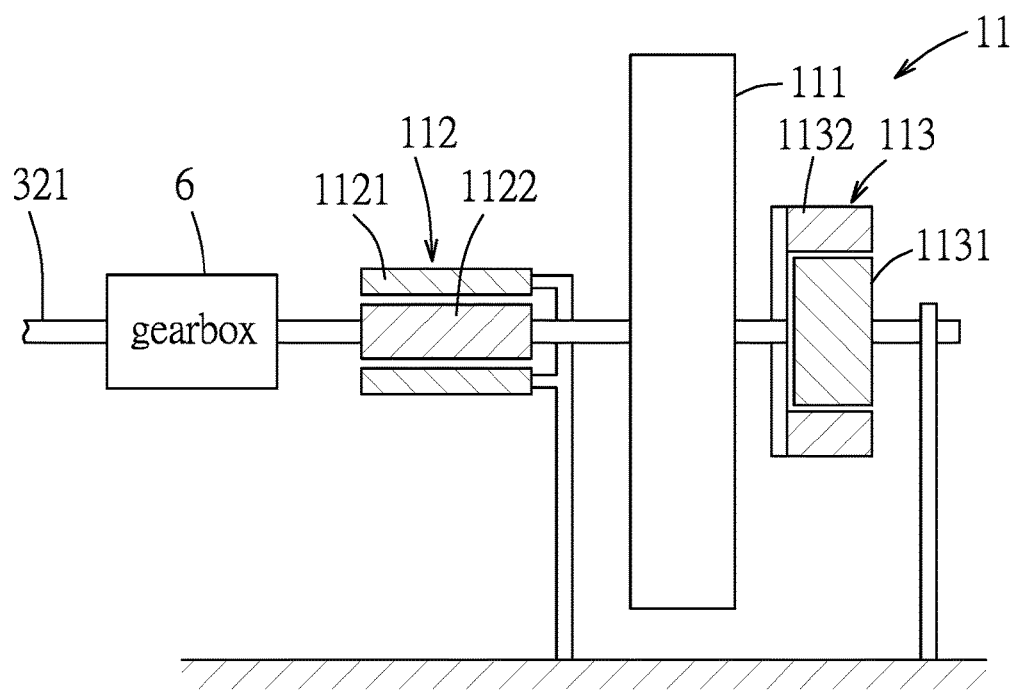
FIG. 24 is a structural block diagram illustrating the flywheel energy storage device and a gearbox of a fifth embodiment of the energy storage and transmission system according to the disclosure.

Referring to FIG. 24, a fifth embodiment of the energy storage and transmission system according the disclosure is a modification of the fourth embodiment, and differs from the fourth embodiment in that it further includes a gearbox 6 which is coupled between the first rotor 1122 and the first shaft journal 321. Therefore, the first rotor 1122 and the first shaft journal 321 can have different rotary speeds.

Figure 25:
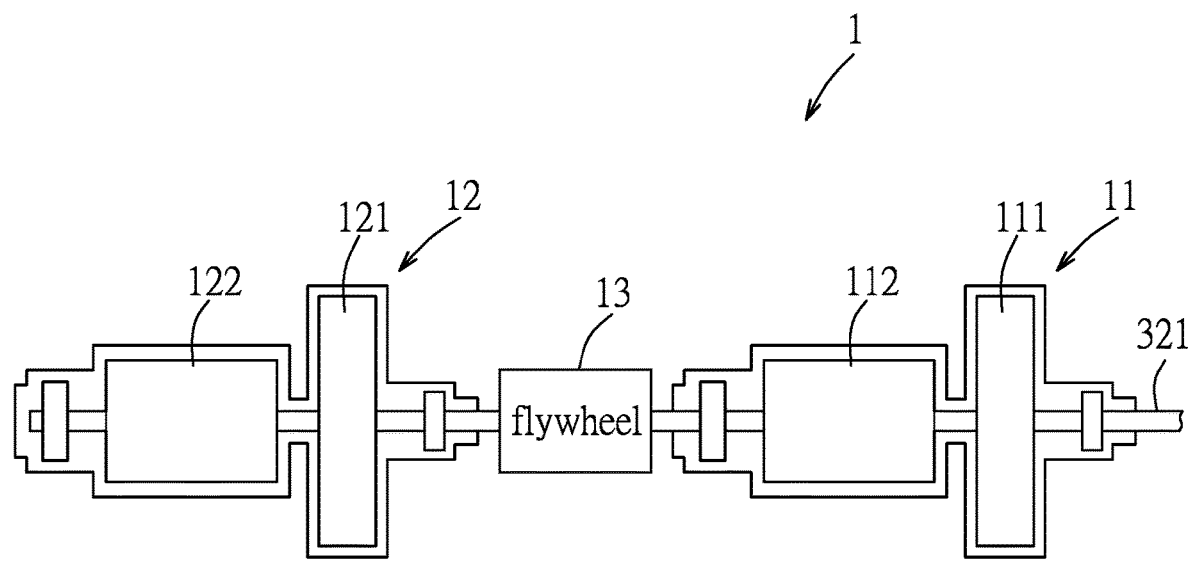
FIG. 25 is a structural block diagram illustrating the flywheel energy storage device of a sixth embodiment of the energy storage and transmission system according to the disclosure.
Figure 26:
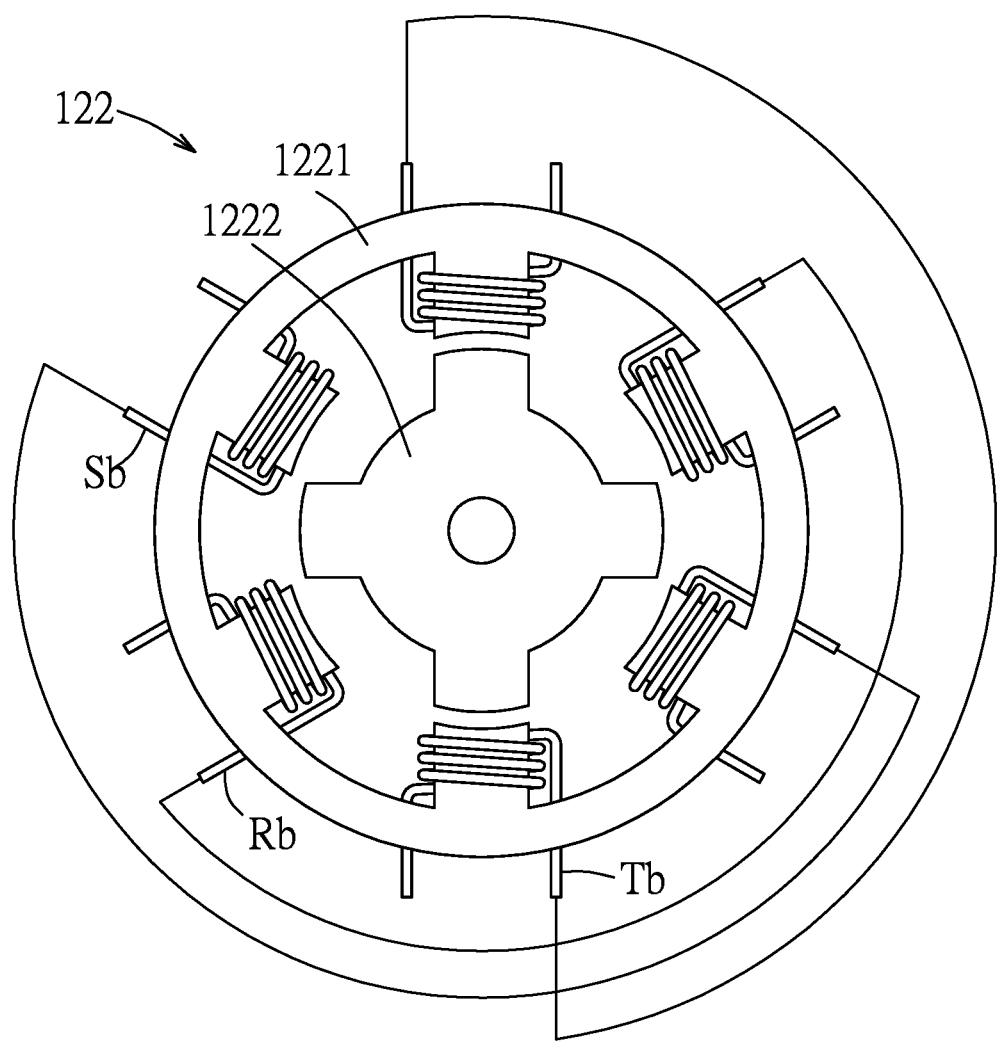
FIG. 26 is a structural diagram illustrating a second motor of the flywheel energy storage device of the sixth embodiment.
Figure 27:
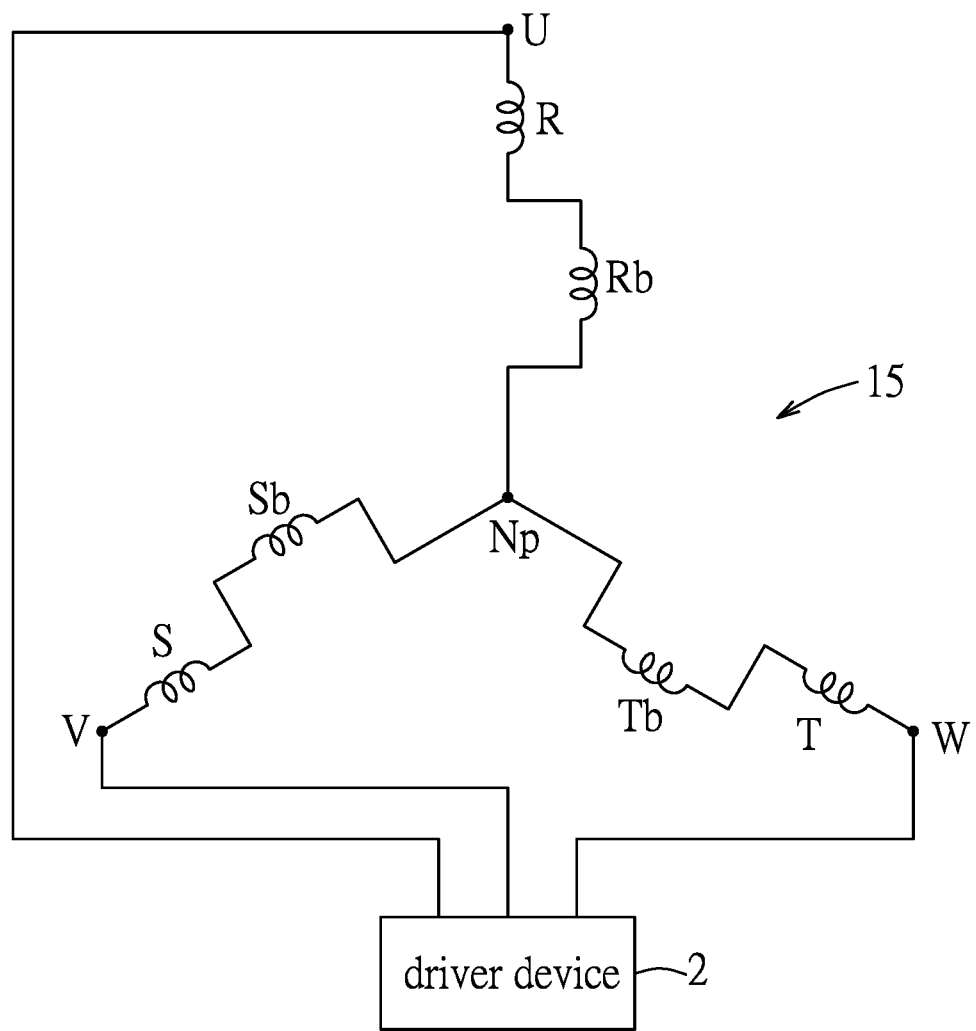
FIG. 27 is a circuit block diagram illustrating the first coils of the first motor and second coils of the second motor of the sixth embodiment.

Referring to FIGS. 25 to 27, a sixth embodiment of the energy storage and transmission system according the disclosure is a modification of the first embodiment, and differs from the first embodiment in that the flywheel energy storage device 1 further includes a second electric machine 12 and a flywheel 13.

In the sixth embodiment, the second electric machine 12 includes a second flywheel 121 and a second motor 122. The second motor 122 includes a second stator 1221, a second rotor 1222 that is coupled to the second flywheel 121, and a number (P) (three in this embodiment) of second coils (Rb, Sb, Tb) that are wound around the second stator 1221. In this embodiment, the second stator 1221 surrounds the second rotor 1222, but the disclosure is not limited thereto. The second coils (Rb, Sb, Tb) cooperate with the first coils (R, S, T) to form the first star configuration 15, with each second coil (Rb, Sb, Tb) coupled in series with a respective first coil (R, S, T) between a respective end terminal (U, V, W) and the central terminal (Np). The flywheel 13 is coupled to the first rotor 1122 (see FIG. 7) and the second rotor 1222. In operation, the driver device 2 causes the first rotor 1122 (see FIG. 7) and the second rotor 1222 to rotate, and the first rotor 1122 (see FIG. 7) and the second rotor 1222 cooperatively cause the flywheels 111, 121, 13 and the first shaft journal 321 to rotate. Therefore, the flywheel storage device 1 of the sixth embodiment can provide relatively high output power as compared to that of the first embodiment.

Figure 28:
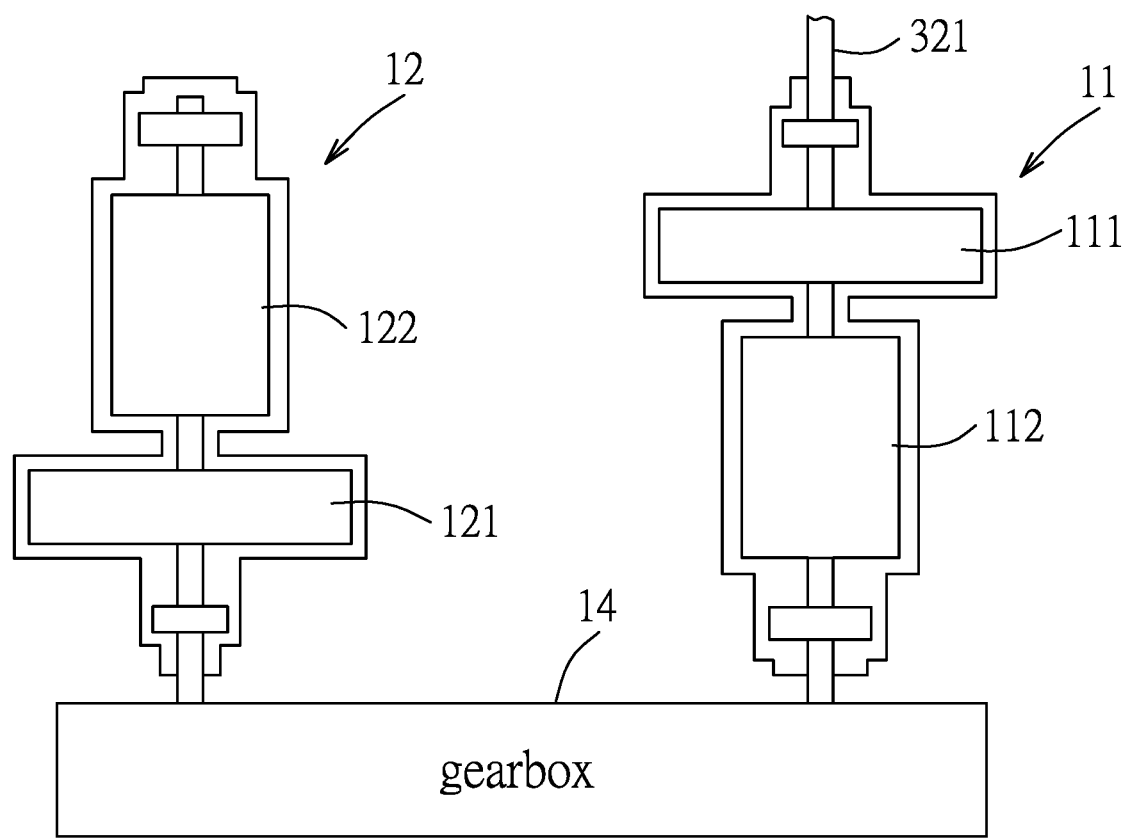
FIG. 28 is a structural block diagram illustrating the flywheel energy storage device of a seventh embodiment of the energy storage and transmission system according to the disclosure.

Referring to FIG. 28, a seventh embodiment of the energy storage and transmission system according the disclosure is a modification of the sixth embodiment, and differs from the sixth embodiment in that the flywheel energy storage device 1 includes a gearbox 14 to replace the flywheel 13 (see FIG. 25). The gearbox 14 may be one as disclosed in any of Taiwanese Patents Nos. M517712, M526020 and M539484. Therefore, the first rotor 1122 (see FIG. 7) and the second rotor 1222 (see FIG. 26) can have different rotary speeds.

In view of the above, each of the aforesaid embodiments has the following advantages:

1. Most of the energy released by the coils (R, S, T, Ra, Sa, Ta, Rb, Sb, Tb) (see FIGS. 8, 23 and 27) of the flywheel energy storage device 1 (see FIG. 5) can be stored for future use, instead of being dissipated as heat. Therefore, the storage and transmission system has good energy saving performance and does not require a cooling system.

2. The reciprocal movement of the piston 312 (see FIG. 12) is caused by the flywheel energy storage device 1 (see FIG. 5) (which is electrically driven by the DC power source 4 (see FIG. 5) through the driver device 2) without using fuel.

3. The DC supply voltage (Vdc) (see FIG. 9) can be stabilized by the first capacitors (C1) (see FIG. 9). Therefore, malfunction of the flywheel energy storage device 1 (see FIG. 5) can be prevented.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. An energy storage and transmission system comprising:
a flywheel energy storage device including
a first electric machine including a first flywheel and a first motor, said first motor including a first stator, a first rotor that is coupled to said first flywheel, and a number (P) of first coils that are wound around said first stator, where P≥3, said first coils cooperatively forming a first star configuration that has a central terminal and a number (P) of end terminals, with each of said first coils coupled between a respective one of said end terminals of said first star configuration and said central terminal of said first star configuration;
a driver device for driving said flywheel energy storage device, and including
a number (P) of legs each including a first switch and a second switch which are coupled to each other, and a common node of which is coupled to a respective one of said end terminals of said first star configuration, said first switches of said legs being coupled to each other, and a common node thereof being used to be coupled to a positive terminal of a direct current (DC) power source, said second switches of said legs being coupled to each other, and a common node thereof being used to be coupled to a negative terminal of the DC power source,
a number (P) of first diodes each coupled to said first switch of a respective one of said legs in parallel, with its anode coupled to said common node of said first and second switches of said respective one of said legs,
a number (P) of second diodes each coupled to said second switch of a respective one of said legs in parallel, with its cathode coupled to said common node of said first and second switches of said respective one of said legs, at least one first capacitor each coupled between said common node of said first switches and said common node of said second switches, a second capacitor coupled between said common node of said first switches and said central terminal of said first star configuration, and a third capacitor coupled between said central terminal of said first star configuration and said common node of said second switches; and a transmission device driven by said flywheel energy storage device, and including a cylinder including a housing, a piston, a first connecting rod and a second connecting rod, said housing defining a first space, a second space, and a channel that is in spatial communication with the first and second spaces, said piston being disposed in the channel, and being capable of reciprocal movement in the channel, said first connecting rod being disposed in the first space and the channel, and having a first terminal that is pivotally coupled to said piston in the channel, and a second terminal that is disposed in the first space, said second connecting rod being disposed in the second space and the channel, and having a first terminal that is pivotally coupled to said piston in the channel, and a second terminal that is disposed in the second space, a first crankshaft including a first shaft journal that is coupled to said first rotor, and a first crank arm that extends radially from said first shaft journal, that is disposed in the first space, and that is pivotally coupled to said second terminal of said first connecting rod, and a second crankshaft including a second shaft journal, and a second crank arm that extends radially from said second shaft journal, that is disposed in the second space, and that is pivotally coupled to said second terminal of said second connecting rod.

2. The energy storage and transmission system of claim 1, wherein:

said first stator surrounds said first rotor; and said first electric machine further includes a second motor, said second motor including a second stator, a second rotor that is coupled to said first rotor and that surrounds said second stator, and a number (P) of second coils that are wound around said second stator, said second coils cooperating with said first coils to form said first star configuration, with each of said second coils coupled in series with a respective one of said first coils between a respective one of said end terminals of said first star configuration and said central terminal of said first star configuration.

3. The energy storage and transmission system of claim 2, wherein a ratio of an outer diameter of said first motor to an outer diameter of said second motor is 1:2, and a ratio of a length of said first motor to a length of said second motor is 2:1.

4. The energy storage and transmission system of claim 2, wherein said first motor is a high-speed low-torque motor, and said second motor is a high-torque low-speed motor.

5. The energy storage and transmission system of claim 1, further comprising a gearbox that is coupled between said first rotor and said first shaft journal.

6. The energy storage and transmission system of claim 1, wherein said flywheel energy storage device further includes:

a second electric machine including a second flywheel and a second motor, said second motor including a second stator, a second rotor that is coupled to said second flywheel, and a number (P) of second coils that are wound around said second stator, said second coils cooperating with said first coils to form said first star configuration, with each of said second coils coupled in series with a respective one of said first coils between a respective one of said end terminals of said first star configuration and said central terminal of said first star configuration; and a flywheel coupled to said first and second rotors.

7. The energy storage and transmission system of claim 1, wherein said flywheel energy storage device further includes:

a second electric machine including a second flywheel and a second motor, said second motor including a second stator, a second rotor that is coupled to said second flywheel, and a number (P) of second coils that are wound around said second stator, said second coils cooperating with said first coils to form said first star configuration, with each of said second coils coupled in series with a respective one of said first coils between a respective one of said end terminals of said first star configuration and said central terminal of said first star configuration; and a gearbox coupled to said first and second rotors.

8. The energy storage and transmission system of claim 1, wherein each of said at least one first capacitor is a polarized capacitor, and each of said second and third capacitors is a non-polarized capacitor.

9. The energy storage and transmission system of claim 1, wherein said driver device further includes a rechargeable battery that is coupled between said common node of said first switches and said common node of said second switches.

10. The energy storage and transmission system of claim 9, wherein said rechargeable battery is one of a capacitor battery and an acid/alkaline hybrid resonance battery.

11. The energy storage and transmission system of claim 1, further comprising an inductive device that includes:

a generator including a stator, a rotor that is coupled to said first shaft journal, and a number (Q) of coils that are wound around one of said stator and said rotor, where Q≥3, said coils cooperatively forming a second star configuration that has a central terminal and a number (Q) of end terminals, with each of said coils coupled between a respective one of said end terminals of said second star configuration and said central terminal of said second star configuration; and a damping circuit including a number (Q) of third diodes, a number (Q) of fourth diodes, a first capacitor unit and a second capacitor unit, each of said third diodes having an anode that is coupled to a respective one of said end terminals of said second star configuration, and a cathode that is coupled to said common node of said first switches, each of said fourth diodes having an anode that is coupled to said common node of said second switches, and a cathode that is coupled to a respective one of said end terminals of said second star configuration, said first capacitor unit being coupled between said common node of said first switches and said central terminal of said second star configuration, said second capacitor unit being coupled between said central terminal of said second star configuration and said common node of said second switches.

12. The energy storage and transmission system of claim 11, wherein said damping circuit further includes an electrolytic battery that is coupled between said common node of said first switches and said common node of said second switches.

* * * * *